United States Patent
Balema et al.

(10) Patent No.: US 11,585,000 B2
(45) Date of Patent: Feb. 21, 2023

(54) ELECTROCATALYST FOR WATER ELECTROLYSIS

(71) Applicant: Iowa State University Research Foundation, Inc., Ames, IA (US)

(72) Inventors: Viktor Balema, Ames, IA (US); Sonal Padalkar, Ames, IA (US); Ihor Hlova, Ames, IA (US); Tian Lan, Ames, IA (US); Oleksandr Dolotko, Ames, IA (US); Vitalij K. Pecharsky, Ames, IA (US); Duane D. Johnson, Ames, IA (US); Arjun K. Pathak, Ames, IA (US); Prashant Singh, Jaipur (IN)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 16/602,420

(22) Filed: Oct. 1, 2019

(65) Prior Publication Data

US 2020/0109479 A1 Apr. 9, 2020

Related U.S. Application Data

(60) Provisional application No. 62/766,165, filed on Oct. 4, 2018.

(51) Int. Cl.
| | |
|---|---|
| *C25B 11/075* | (2021.01) |
| *C25B 1/04* | (2021.01) |
| *C25B 11/051* | (2021.01) |
| *C25B 11/057* | (2021.01) |
| *C25B 11/091* | (2021.01) |

(Continued)

(52) U.S. Cl.
CPC ........ *C25B 11/075* (2021.01); *C23C 18/1639* (2013.01); *C23C 18/42* (2013.01); *C25B 1/04* (2013.01); *C25B 11/051* (2021.01); *C25B 11/057* (2021.01); *C25B 11/091* (2021.01);
(Continued)

(58) Field of Classification Search
CPC ............. C25B 1/02–1/12; C25B 11/04; C25B 11/0405; C25B 11/0442; C25B 11/0447–11/0473; C25B 11/0478–11/0494; C25B 1/50; B01J 27/02; B01J 27/04; B01J 27/0243–27/0515; B01J 27/057; B01J 27/0573; B01J 27/0576; B01J 23/38–23/688; B01J 23/70–23/8993
See application file for complete search history.

(56) References Cited

U.S. PATENT DOCUMENTS

2017/0218529 A1\* 8/2017 Sharman ............. C25B 11/0405

OTHER PUBLICATIONS

He et al ("1T'-Mo1-xWxS2/CdS Heterostructure Enabling Robust Photocatalytic Water Splitting: Unveiling the Interfacial Charge Polarization", Solar RRL, vol. 2, issue 6, Mar. 2018, pp. 1800032-1-1800032-8) (Year: 2018).\*

(Continued)

*Primary Examiner* — Alexander W Keeling

(57) ABSTRACT

A cathode is provided for electrolysis of water wherein the cathode material comprises a multi-principal element, transition metal dichalcogenide material that has four or more chemical elements and that is a single phase, solid solution. The pristine cathode material does not contain platinum as a principal (major) component. However, a cathode comprising a transition metal dichalcogenide having platinum (Pt) nanosized islands or precipitates disposed thereon is also provided.

12 Claims, 7 Drawing Sheets

(51) Int. Cl.
    C25D 3/50    (2006.01)
    C25D 5/02    (2006.01)
    C23C 18/42   (2006.01)
    C23C 18/16   (2006.01)
    C25D 13/02   (2006.01)
    G01N 27/48   (2006.01)

(52) U.S. Cl.
    CPC .............. *C25D 3/50* (2013.01); *C25D 5/02* (2013.01); *C25D 13/02* (2013.01); *G01N 27/48* (2013.01)

(56) References Cited

OTHER PUBLICATIONS

Palit et al ("Studies on layer disorder, microstructural parameters and other properties of tantalum substituted tungsten-molybdenum selenide, W0.65Mo0.35-xTaxSe2, (0≤x≤0.35)", Materials Chemistry and Physics 49, 1997, pp. 22-28). (Year: 1997).*
Chia et al ("Tunable Pt—MoSx Hybrid Catalysts for Hydrogen Evolution", ACS Applied Materials & Interfaces, 10, Mar. 2018, pp. 8702-8711) (Year: 2018).*
Nguyen et al ("Liquid Exfoliation of Layered Transition Metal Dichalcogenides for Biological Applications", Current Protocols in Chemical Biology, vol. 8, issues 2, 2016, pp. 97-108) (Year: 2016).*
Zhou et al ("Molybdenum dichalcogenide nanotube arrays for hydrogen-evolutionreaction catalysis: Synergistic effects of sulfur and selenium in a core-shell tube wall", Electrochemistry Communications, 82, 2017, pp. 112-116) (Year: 2017).*
Srivastava et al ("Studies on layer disorder, microstructural parameters and other properties of tungsten-substituted molybdenum disulfide, Mo1-xWxS2 (0 ≤x≤ 1)", Synthetic Metals, vol. 90, issue 2, 1997, pp. 135-142) (Year: 1997).*
Zhuang et al ("Engineering sub-100 nm Mo(1-x)WxSe2 crystals for efficient hydrogen evolution catalysis", Journal of Materials Chemistry A, 2018, 9, pp. 2900-2907) (Year: 2018).*

Guoliang Zhang, et al, High entropy alloy as a highly active and stable electrocatalyst for hydrogen evolution reaction, Electrochimica Acta, 279, pp. 19-23, 2018.
O. Schmidt et al, Future coast and performance of water electrolysis: An expert elicitation study, International Journal of Hydrogen Energy, 42, pp. 30470-30492, 2017.
Alfi Eftekharia, Electrocatalysts for hydrogen evolution reaction, International Journal of Hydrogen Energy, pp. 11053-11077, 2017.
John A. Turner et al, Sustainable Hydrogen Production, Science, 305, pp. 972, 2004.
Xiaoxin Zou et al, Noble metal-free hydrogen evolution catalysts for water splitting, Chem. Soc. Rev., 44, pp. 5148, 2015.
Yuan Wang et al, Electrochemcial Hydrogen Evolution Reaction Effieciently Catalyzed by Ru2P Nanoparticles, ChemSusChem, 11, pp. 2724-2729, 2018.
Yanguang Li et al, MoS2 Nanoparticles Grown on Graphene: An Advanced Catalyst for the Hydrogen Evolution Reaction, Journal of the American Chemical Society, 133, 7296, 2011.
Xinyl Chia et al, Layered transition metal dichalcogenide electrochemistry; journey across the periodic table, Chem. Soc. Rev., 47, pp. 5602-5613, 2018.
Yong Wang et al, Graphene/Group 5 Transition Metal Dichalcogenide Composites for Electrochemical Applications, Chem. Eur., 23, pp. 10430-10437, 2017.
Yu Lei et al, Low-temperature Synthesis of Heterostructures of Transition Metal Dichalcogenide Alloys (WxMo1-xS2) and Graphene with Superior Catalytic Performance for Hydrogen Evolution, ACS Nano, 11, 5103, 2017.
Yundan Liu et al, 3D Binder-free MoSe2 Nanosheets/Carbon Cloth Electrodes for Efficient and Stable Hydrogen Evolution Prepared by Simple Electrophoresis Deposition Strategy, Scientific Reports, 6, 22516, 2017.
Van-Truong Nguyen et al, New Simultaneous Exfoliation and Process for Generating MX2 Nanosheets for Electrocatalytic Hydrogen Evolution Reaction, ACS Appl. Mater. Interfaces, 11, pp. 14786-14795, 2019.
A. Kolobov et al, Two-Dimensional Transition-Metal Dichalcogenides, Spring Series in Materials Science, 239 pp. 503-504, 2016.

* cited by examiner

ELECTROCATALYST FOR WATER ELECTROLYSIS

RELATED APPLICATION

This application claims benefit and priority of U.S. provisional application Ser. No. 62/766,165 filed Oct. 4, 2018, the entire disclosure of which is incorporated herein by reference.

CONTRACTUAL ORIGIN OF THE INVENTION

This invention was made with government support under Contract No. DE-AC02-07CH11358 awarded by the U.S. Department of Energy. The government has certain rights in the invention.

FIELD OF THE INVENTION

The present invention relates to the electrochemical splitting of water and, more particularly, to an electrocatalyst comprising certain transition metal chalcogenide materials for use as the cathode for the electrochemical hydrogen evolution reaction.

BACKGROUND OF THE INVENTION

Hydrogen ($H_2$) is a unique energy carrier in that it can be produced via diverse pathways utilizing a variety of domestically available feedstock, including natural gas, biomass, and water (reference 1).

The electrochemical splitting of water (electrolysis) is among the most versatile methods of hydrogen generation that is expected to play a significant role in long-term, high-volume hydrogen gas production (reference 2).

The electrolysis of water is a combination of two space separated electrochemical processes—the hydrogen and oxygen evolution reactions (HER and OER, respectively). During HER, water is reduced to $H_2$ using electrons supplied by the negative electrode (cathode) of an electrochemical cell, while oxygen ($O_2$) is produced by OER at its positive counterpart (anode) (FIG. 1). Since HER and OER are separated in space, the produced hydrogen and oxygen require only limited, if any, purification.

In an ideal electrochemical cell, operating at 25° C. under atmospheric pressure (760 mmHg or 101325 Pa, or 14.696 psi), oxidation of water occurs at the anode potential of $E°_a$=1.23V and the hydrogen evolution takes place at the cathode at $E°_c$=0 V (standard hydrogen electrode).

Anode (OER): $H_2O(aq) \rightarrow \frac{1}{2} O_2(gas) + 2H^+(aq) + 2e^-$

Cathode (HER): $2H^+(aq) + 2e^- \rightarrow H_2(gas)$

Thus, the voltage to be applied to an ideal electrolyzer cell is $E°_{cell} = E°_c - E°_a = -1.23V$. However, in practice, water electrolyzers operate at higher cell voltages due to energy losses by non-ideal electrochemical processes. The fraction of the electrical potential (E), exceeding the theoretical value of −1.23V is defined as overpotential ($\eta$) that includes the overpotentials of the anode ($\eta_a$) and cathode ($\eta_c$) materials as well as other detrimental contributions ($\eta_o$) attributed to solution and contact resistance and other factors (reference 3).

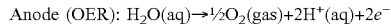

$E = E°_{cell} + \eta$

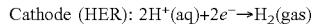

$\eta = \eta_a + \eta_c + \eta_o$

Among known cathode materials, platinum shows the highest electro-catalytic activity for HER in acidic solutions and the lowest $\eta_c$ that is below −0.1V at the current density of 10 mA/cm². Also the Tafel slope, which defines mechanism and efficiency of HER is very low for Pt—only about 30 mV/dec in an acidic environment (references 4, 5).

Several types of water electrolyzers are currently in use (reference 6). They include low-temperature electrochemical systems that are based on the proton exchange membrane technology (PEMEC), which operates in acidic environment, alkaline electrolytic cells (AEC) operating in basic solutions, and high-temperature water-splitting systems that utilize the decomposition of vaporized water on solid oxide electrodes (SOEC). Among the aforementioned technologies, PEMEC emerges as superior contender, demonstrating high working current density (2 $Am^{-2}$), low operating temperature (82° C. vs. 650-1000° C. for SOEC) and, unlike AEC, an ability to function under high pressures of $H_2$ (about 200 bar). One of the main weakness of PEMECs, impeding their broad practical applications, is high cost and scarcity of platinum (Pt), which is an essential element of their working electrodes.

Layered transition metal dichalcogenides (TMDCs), such as $MoS_2$, $WS_2$, $MoSe_2$, $WSe_2$ and some others (reference 1), represent a less expensive and more abundant alternative to Pt. They are built from covalently bonded metal-chalcogen layers that are held together by weak van der Waals (vdW) forces (FIG. 2). Although thermodynamically stable, bulk TMDCs are rather weak electrical conductors, they show electrocatalytic activities in HER, which are sufficient for their use in electrochemical water splitting systems (references 7, 8, 9).

TMDC-based HER electrocatalysts are usually binary or ternary compounds that combine two or three different chemical elements, i.e. transition metals and chalcogens (S, Se, Te), in their makeup. In a number of cases two or more individual (single-phase) TMDCs have been combined in composite materials (reference 10) that can also contain graphite or graphene, increasing their electrical conductivity (references 11, 12).

SUMMARY OF THE INVENTION

An embodiment of the present invention provides an electrode material useful for electrolysis of water comprising certain transition metal chalcogenides having four or more chemical elements as single phase, solid solution cathode material.

In an illustrative embodiment, the single phase, solid solution electrode (e.g. cathode) material is represented by the general formula of: $(M_a^1 M_b^2 M_c^3 \ldots M_n)(X^1_A X^2_B X^3_C)$, wherein $M^1$, $M^2$, $M^3$ . . . $M_n$ each represents a different transition metal and wherein the sum of a+b+c . . . n is between 1 and 3, wherein $X^1$, $X^2$, $X^3$ each represents a chalcogen element selected from the group consisting of S, Se, and Te and wherein the sum of A+B+C is between 2 and 6, and wherein the pristine material preferably does not contain platinum as a principle (major) component.

Illustrative embodiments of such cathode materials include, but are not limited to, multi-metal and multi-chalcogen materials such as $(Mo_{0.5}W_{0.5})SSe$, $(Mo_{0.4}W_{0.4}Ta_{0.2})SSe$ and $(Mo_{0.475}W_{0.475}Ta_{0.05})SSe$ as well as multi-metal and single chalcogen materials such as $(W_{0.4}Mo_{0.4}Ta_{0.2})S_2$, or $(W_{0.475}Mo_{0.475}Ta_{0.2})S_2$, Wherein the overpotential and Tafel slopes of the these materials are superior to those of similarly treated $MoS_2$ and $WSe_2$.

Certain embodiments of the invention provide the electrode material in the form of particles of a size between 0.6 nm and 1 micron (1000 nm) and/or other particulates of a size in one dimension between 0.6 nm and 1 micron (1000 nm) in the second and/or third dimensions such as represented by nano- or micro-plates, rods, wires, tubes, thin films and similar asymmetrical structures.

Other embodiments of the invention provide the electrode material in the bulk form as monolithic sheets, rods, plates, wires, or tubes whose electric resistivity is less than 20 Ω-cm. Such bulk forms can be made by cold and/or hot pressing the particles or by other fabricating techniques.

Cathode materials pursuant to certain illustrative embodiments of the invention are advantageous in that they are stable in acidic aqueous environments during water electrolysis and exhibit an overpotential below 0.5V vs. the reversible hydrogen electrode (RHE) at 10 mA/cm² current density during electrolysis of water in acidic environment at room temperature. The cathode material can have a conductive nature itself or the material can be combined with a conductive material to form a composite cathode material.

Furthermore, other embodiments of the invention provide an electrode (e.g. cathode) comprising a transition metal dichalcogenide substrate having platinum (Pt) nanosized islands (localized Pt areas) deposited on the electrode surface. The Pt nanosized islands are less than 50 nm as measured along at least one dimension of each localized island. Such a cathode electrode behaves electrochemically, in water electrolysis, similar to a platinum metal electrode. A certain method embodiment forms such an electrode by repeated (consecutive) volt scans performed on the pristine transition metal dichalcogenide cathode substrate in an aqueous solution in the presence of a platinum counter electrode until the nano-sized islands are deposited on the surface of the electrode cathode substrate.

The present invention envisions a water electrolysis cell and method that use the electrode material described above as the working cathode to positively affect the hydrogen evolution reaction.

The present invention and advantages thereof will be described below in more detail with respect to certain embodiments offered for purposes of illustration and not limitation in relation to the following drawings.

DESCRIPTION OF THE INVENTION

Figure 1:
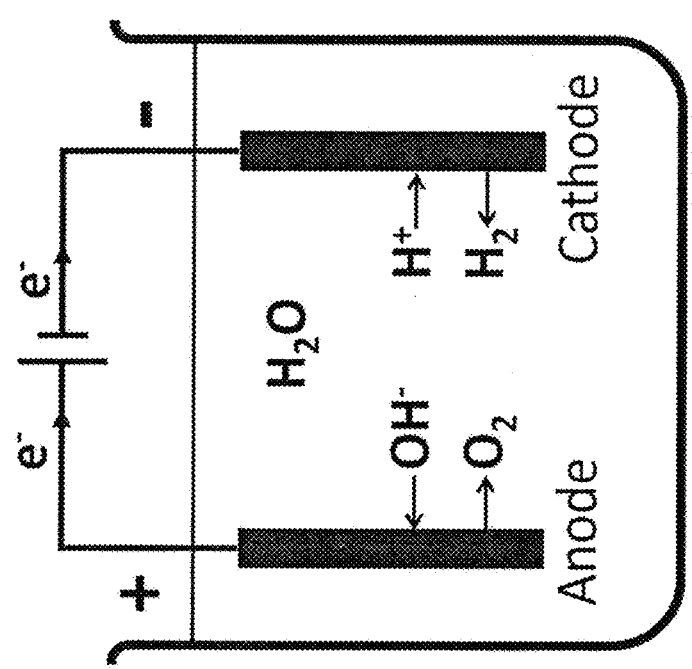
FIG. 1 is a schematic diagram of an electrochemical cell for electrolysis of water.

The present invention provides in some embodiments certain multi-principal element, high-entropy transition metal dichalcogenide materials (HE-TMDCs) comprising four and more chemical elements and present as a single phase, solid solutions for use as electrocatalysts for the hydrogen evolution reaction (HER) in the electrolysis of water. The TMDCs described below are referred to as high entropy (HE) materials in that they have unique features of high-entropy materials; namely, a combination of structural irregularities such as random distribution of different atoms in corresponding metal and chalcogen sub-lattices, lattice defects and vacancies and an enhanced stability such as chemical resistivity toward acidic environment.

Certain embodiments of the invention involve a cathode material that is represented by the general formula of: $(M_a^1 M_b^2 M_c^3 \ldots M_n)(X_A^1 X_B^2 X_C^3)$, wherein $M^1, M^2, M^3 \ldots M_n$ each represents a different transition metal and wherein the sum of a+b+c ... n is between 1 and 3, wherein $X^1, X^2, X^3$ each represents a chalcogen element selected from the group consisting of S, Se, and Te and wherein the sum of A+B+C is between 2 and 6.

Such materials can combine two or more group 4 and/or group 5 transition metals, and/or group 6 transition metal, and/or group 9 transition metal, and/or group 10 transition metal with one or more chalcogens (S, Se, Te; group 16 chalcogen elements) in their structures. These group numbers correspond to those of the Periodic Table of Elements. Moreover, the cathode material does not contain platinum (Pt) as a principal (major) component. The Pt content of the cathode material preferably is less than 10 atomic % to this end.

Figure 2:
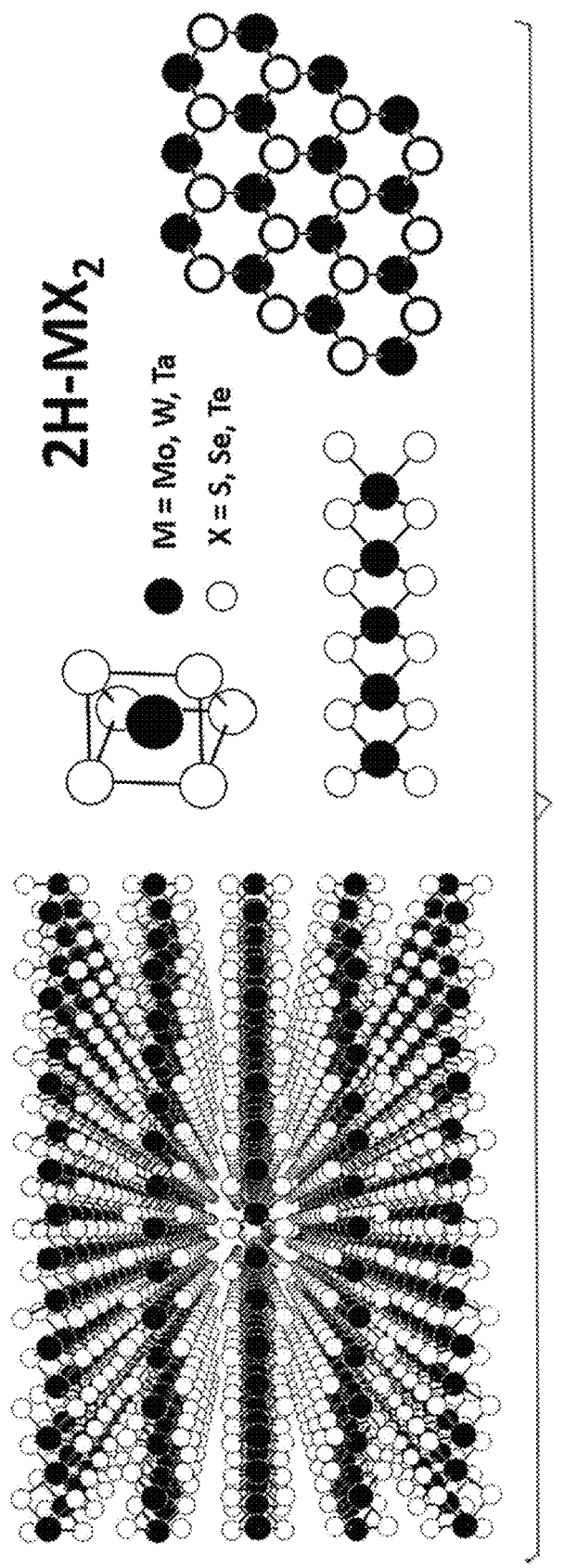
FIG. 2 shows layered structure of transition metal dichalcogenides (TMDC, $MX_2$); blue circles represent transition metals (e.g. Mo, W, Ta etc.) and yellow circles stand for chalcogens (S, Se or Te).

Certain embodiments provide the cathode material in the form of particles of a size between 0.6 nm and 5 micron (5000 nm) and/or other particulates of a size in one dimension between 0.6 nm and 5 micron (5000 nm) in the second and/or third dimensions such as represented by plates, rods, wires, tubes, thin films, and similar asymmetrical structures. Such particle/particulates themselves each can comprise a single TMDC nano layer or multiple, stacked TMDC layers (FIG. 2), that are assembled by a self-assembly process or active mixing process to form multiple stacked layered particles/particulates as described in patent application Ser. No. 15/998,266 filed Jul. 26, 2018, US publication No. 2019/0039913, the disclosure of which is incorporated herein by reference to this end.

Bulk forms such as bulk monolithic plates, rods, wires, tubes, etc. for cathode bodies can be made by cold and/or hot pressing powder/particulates using known powder metallurgy techniques, or by other fabricating methods.

The cathode particles/particulates can be formed by various techniques into a working cathode of the water electrolysis cell. Such techniques include, but are not limited to electrophoretic deposition of the particles/particulates on a substrate (reference 13), drop-casting, (reference 14), or any other electrode preparation technique.

Such particles/particulates can be mixed with any conductive material in particle, fiber or other particulate form such as graphite, graphene, graphene oxide, reduced graphene oxide, metal, polymer, and/or ceramics to form a composite material for use as a cathode for the HER that shows overpotential below 0.5 V vs the reversible hydrogen electrode (RHE) at 10 mA/cm$^2$ current density during electrolysis of water in acidic environment at room temperature. The mixture then can be placed on a substrate using drop-casting or electrophoretic deposition procedure, or otherwise formed into a working cathode for HER.

Importantly, the working cathode or composite working cathode is stable in an acidic aqueous environment, such as having pH less than 1, and can exhibit an overpotential below 0.5 V vs the reversible hydrogen electrode (RHE) at 10 mA/cm$^2$ current density during electrolysis of water in such acidic environment at room temperature. Preferably, the working cathode can exhibit an overpotential below 0.2 V vs the reversible hydrogen electrode (RHE) at 10 mA/cm$^2$ current density during electrolysis of water in acidic environment at room temperature.

The present invention also provides in still other embodiments an electrode (e.g. cathode) comprising a transition metal dichalcogenide substrate having platinum (Pt) nano-sized particles (localized areas) disposed on the cathode surface as described below.

The following examples are offered to further illustrate and not limit embodiments of the present invention.

EXAMPLES

The following TMDC were used in powder form with particle sizes below 1 μm and tested:
$MoS_2$
$WS_2$
$(Mo_{0.5}W_{0.5})S_2$
$(Mo_{0.5}W_{0.5})SSe$
$(Mo_{0.475}W_{0.475}Ta_{0.05})SSe$
$(Mo_{0.4}W_{0.4}Ta_{0.2})SSe$
$(Mo_{0.4}W_{0.4}Ta_{0.2})S_2$
$(Mo_{0.475}W_{0.475}Ta_{0.05})S_2$ All materials, except for commercially acquired $MoS_2$ and $WS_2$ were made in a powder form by process described in patent application Ser. No. 15/998,266 filed Jul. 26, 2018, US. publication No. 2019/0039913, the disclosure of which is incorporated herein by reference above.

The glassy carbon electrodes, CHI104, were acquired from CH Instruments Inc. (Austin, Tex., USA) and used for the preparation of the working electrodes (i.e. as substrate for the TMDC cathode material). Isopropyl alcohol (IPA, ≥99.5%) was purchased from Fisher Scientific (Fair Lawn, N.J., USA) and alumina slurry (particle size=0.05 μm) and the polishing pad (Texmet, diameter=2⅞", a part of PK—4 Polishing Kit) were obtained from BASi (West Lafayette, Ind., USA). Concentrated sulfuric acid ($H_2SO_4$≥99.9%, Sigma-Aldrich, St. Louis, Mo., USA) was used to prepare the 1M $H_2SO_4$ electrolyte solutions. Nafion solution (20 wt % in lower aliphatic alcohols and water) was acquired from Sigma-Aldrich (St. Louis, Mo., USA). $MoS_2$ (99%) and $WS_2$ (99.8%) were purchased from Alfa Aesar (Haverhill Mass., USA). Acetone was purchased from Sigma-Aldrich.

Example 1. Fabrication of TMDC Electrodes by Drop Casting

Prior to the deposition of a TMDC material on the glassy carbon electrode (CHI104), the electrode was cleaned by polishing its surface with the Texmet alumina pad in the presence of the alumina slurry. The cleaning step was followed by rinsing the electrode with acetone and deionized water.

The TMDC powder, such as $MoS_2$, $WS_2$, $(Mo_{0.5}W_{0.5})S_2$ $(Mo_{0.5}W_{0.5})SSe$, $(Mo_{0.4}W_{0.4}Ta_{0.2})S_2$ or $(Mo_{0.475}W_{0.475}Ta_{0.05})S_2$, was suspended in IPA (5 mg/mL) and sonicated using Branson 3800 ultrasonic cleaner for 2 hours at ambient conditions. An aliquot of about 10 μL of the suspension formed was drop cast onto the glassy carbon electrode and dried for 20 min. at room temperature. This procedure was repeated several times. Subsequently, the electrode was dipped into the Nafion® binder solution for about 5 seconds and dried in air. Thus prepared working electrode was used for the electrochemical experiments.

Example 2. Fabrication of TMDC Electrodes by Electrophoretic Deposition

The electrophoretic deposition was carried out in a two electrode, electrochemical cell.

The glassy carbon electrode (CHI104) was used as substrate for the TMDC deposition and a platinum wire served as the counter electrode.

Specifically, 0.3 g of $(Mo_{0.4}W_{0.4}Ta_{0.2})SSe$ powder was dispersed in 15 mL of IPA and sonicated for 8 hours under ambient conditions. Prior to the electrophoretic deposition, the glassy carbon electrode (CHI104) was cleaned by sonication for 5 min in ethyl alcohol, then for 5 min in deionized water. A cyclic voltammogram was recorded from the cleaned electrode and, if no peaks were detected, the electrode was deemed clean.

For the electrophoretic deposition, the cleaned glassy carbon electrode and the platinum wire electrode were placed vertically in an electrochemical cell with a separation distance of 1 cm between them. A deposition voltage 10V was applied across the electrochemical cell for 15 min using the CH16051E potentiostat from CH Instruments. Subsequently, the working electrode formed was dried at 60° C. for 30 min and used for the electrochemical experiments.

Example 3. Electrochemical Experiments

The electrochemical experiments were performed in an electrochemical cell with a three-electrode configuration using BASi Cell Stand and the Epsilon potentiostat.

The glassy carbon electrode (CHI104) with the deposited TMDC served as working electrode (WE) for HER and a 2 mm-platinum wire was used as counter electrode, where OER took place. A silver chloride electrode (Ag/AgCl in 1 M KCl, CH Instruments), calibrated with respect to the reversible hydrogen electrode (RHE), served as the reference electrode, by using high purity $H_2$ saturated 0.5M $H_2SO_4$ electrolyte. The linear sweep voltammetry (LSV) scans were performed at the rate of 2 mV/s in $H_2$ saturated 0.5M $H_2SO_4$ aqueous electrolyte. The acidic aqueous electrolyte was stirred using a magnetic stirrer at a speed of 60 rpm. The LSV data for all TMDCs were corrected for electrolyte resistance (iR correction).

Figures 3A, 3B:
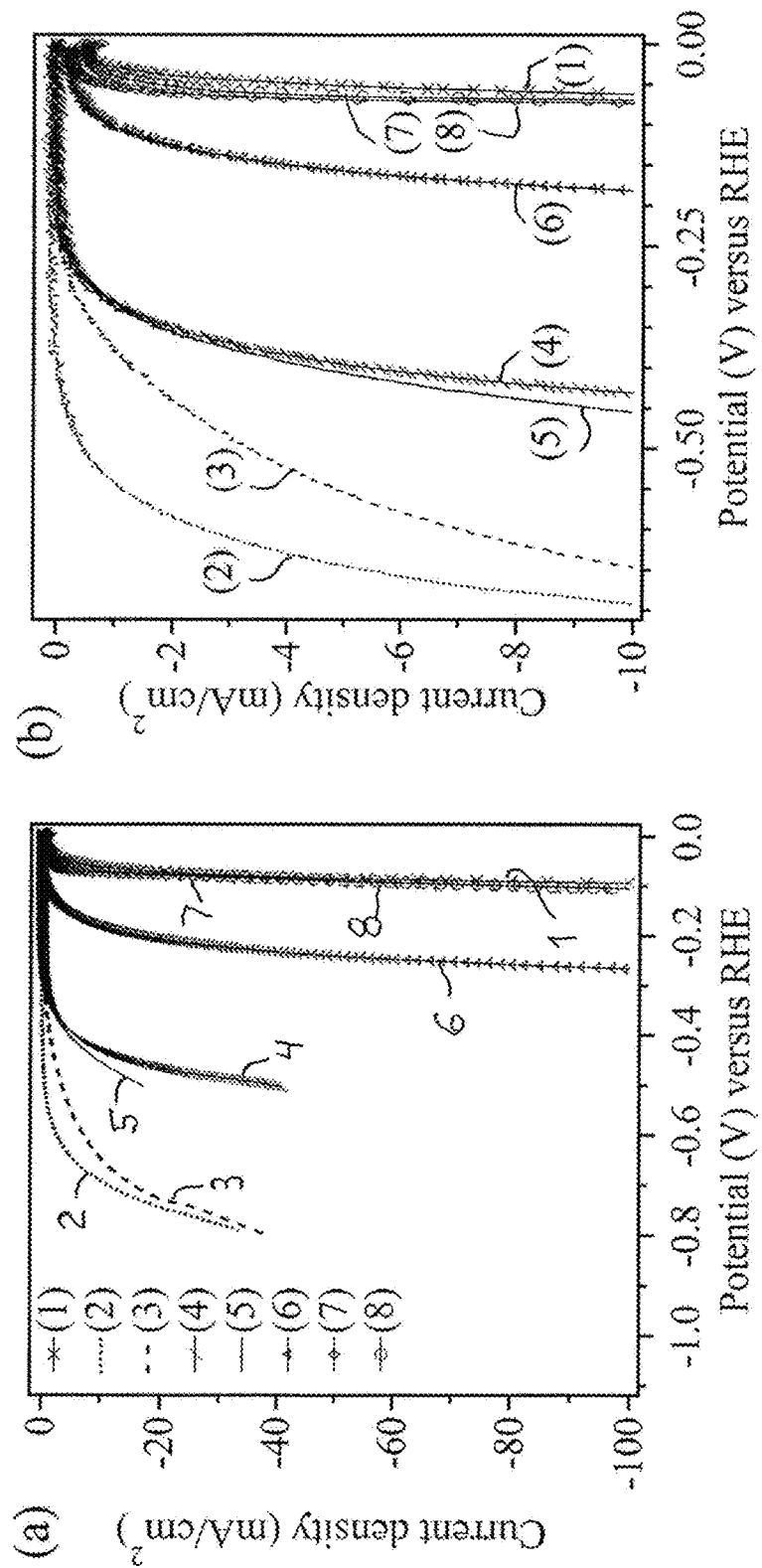
FIG. 3a shows the LSV data for the studied TMDCs electrodes, where numbers correspond to the specific TMDCs: Pt (1), $MoS_2$ (2), $WS_2$ (3), $(Mo_{0.5}W_{0.5})S_2$ (4), $(Mo_{0.5}W_{0.5})SSe$ (5), $(Mo_{0.475}W_{0.475}Ta_{0.05})SSe$ (6), $(Mo_{0.475}W_{0.475}Ta_{0.05})S_2$ (7) and $(Mo_{0.4}W_{0.4}Ta_{0.2})S_2$ (8)
FIG. 3b shows the same plots limited to cut-off current density of 10 mAcm⁻².

FIG. 3a shows iR corrected LSV plots for $MoS_2$, $WS_2$, $(Mo_{0.5}W_{0.5})S_2$, $(Mo_{0.5}W_{0.5})SSe$, $(Mo_{0.475}W_{0.475}Ta_{0.05})SSe$, $(Mo_{0.4}W_{0.4}Ta_{0.2})SSe$, $(Mo_{0.475}W_{0.475}Ta_{0.05})S_2$ and $(W_{0.4}Mo_{0.4}Ta_{0.2})S_2$. The data represent electrode performances that remain constant within about 10 subsequent LSV scans (LSV cycles). For comparison, the performance of a commercial Pt electrode (same as counter electrode) is also shown.

Figure 4:
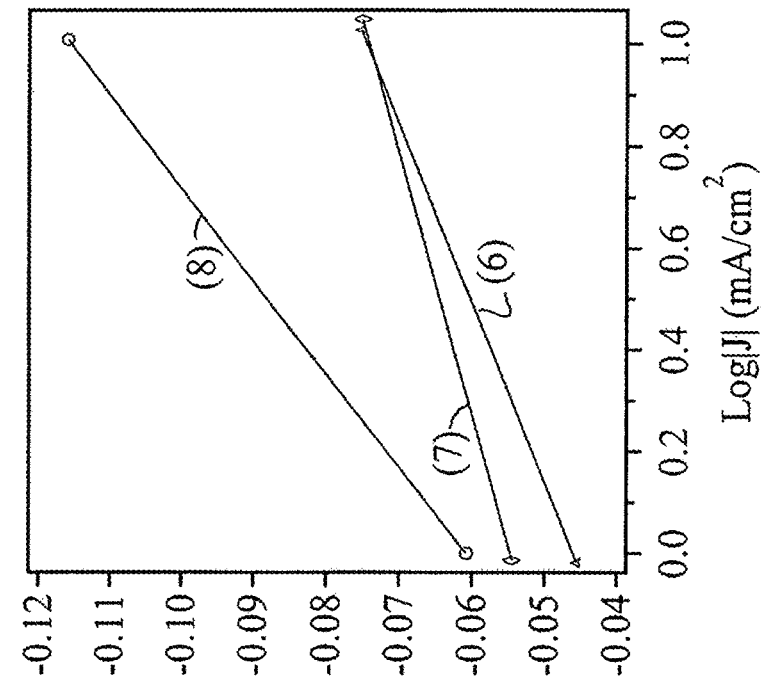
FIG. 4a shows the Tafel plots of Pt (1), $MoS_2$ (2), $WS_2$ (3), $(Mo_{0.5}W_{0.5})S_2$ (4) and $(Mo_{0.5}W_{0.5})SSe$
FIG. 4b shows the Tafel plots for the Ta containing TMDC materials: $(Mo_{0.475}W_{0.475}Ta_{0.05})SSe$ (6), $(Mo_{0.475}W_{0.475}Ta_{0.05})S_2$ (7) and $(Mo_{0.4}W_{0.4}Ta_{0.2})S_2$ (8).
Figure 4:
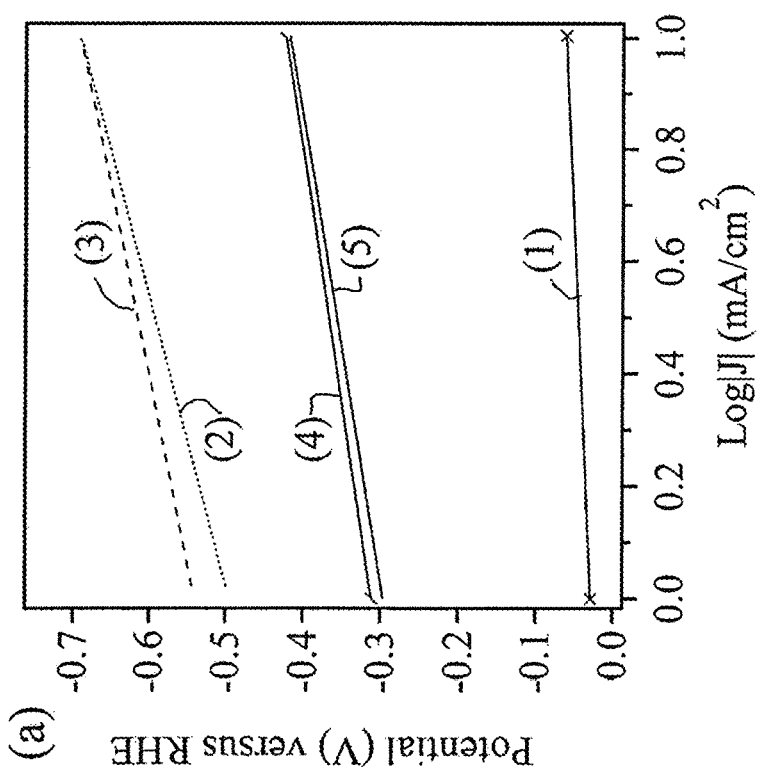

In FIG. 3b, the 10 mA/cm² current density is selected as the cut-off value. The overpotential of the studied TMDC electrodes was defined as the voltage at which the cut-off current density is obtained—a common practice in the field (reference 7). The Tafel slopes of the tested samples are presented in FIGS. 4a, 4b. The collected electrochemical data are also tabulated in Table 1.

TABLE 1

Electrocalalytic activities of the studied TMDC electrodes in hydrogen evolution reaction (HER) Sample

| Sample | Scan Nr. | Current Density (mA/cm²) at 450 mV | Overpotential (mV) at 10 A/cm² | Onset Potential (mV) | Tafel slope (mV/dec⁻¹) |
|---|---|---|---|---|---|
| $MoS_2$ | 10 | 0.131 | 692 | 539 | 150 |
| $WS_2$ | 10 | 2.22 | 646 | 375 | 195.2 |
| $(Mo_{0.5}W_{0.5})S_2$ | 500 | 14.7 | 430 | 316 | 110 |
| $(Mo_{0.5}W_{0.5})SSe$ | 500 | 9.42 | 455 | 326 | 120 |
| $(Mo_{0.475}W_{0.475}Ta_{0.05})SSe$ | 50 | 990 | 260 | 197 | 63 |
| $(Mo_{0.475}W_{0.475}Ta_{0.05})SSe$ | 1000 | 1430 | 181 | 104 | 55 |
| $(Mo_{0.4}W_{0.4}Ta_{0.2})SSe*$ | 40 | 127 | 232 | 176 | 55 |
| $(Mo_{0.475}W_{0.475}Ta_{0.05})S_2$ | 50 | 162 | 276 | 190 | 89 |
| $(Mo_{0.475}W_{0.475}Ta_{0.05})S_2$ | 1000 | 1430 | 72 | 48 | 24 |
| $(W_{0.4}Mo_{04}Ta_{0.2})S_2$ | 50 | 42 | 239 | 138 | 93 |
| $(W_{0.4}Mo_{04}Ta_{0.2})S_2$ | 1000 | 1428.6 | 75 | 43 | 32 |
| Pt (wire) | 10 | 1430 | 62 | 28 | 32 |

*the electrode was fabricated by electrophoretic deposition

The overpotential and Tafel slopes of the multi-element TMDCs cathode materials, pursuant to this invention are far superior to the binary $MoS_2$ and $WS_2$ (see Table 1), whereby $(Mo_{0.5}W_{0.5})SSe$ performs similarly to $(Mo_{0.5}W_{0.5})S_2$, and all Ta-containing TMDCs are far more active as HER electrocatalysts than other tested materials. After 1000 consecutive LSV scans, the single phase, solid solutions deposited cathode materials represented by $(W_{0.4}Mo_{0.4}Ta_{0.2})S_2$ and $(Mo_{0.475}W_{0.475}Ta_{0.05})S_2$ showed electrocatalytic performance exceeding or close to that of the best electrode materials known to date, including Pt (Table 1).

The $(W_{0.4}Mo_{0.4}Ta_{0.2})S_2$ and $(Mo_{0.475}W_{0.475}Ta_{0.05})S_2$ materials consisting of four principle elements, exhibit strong improvements of their performance during LSV scanning and reach the steady performance state after 500 consecutive scans.

High electrical conductivity of Ta containing materials is at least partially responsible for their exceptional performance since it reduces an internal resistivity contributions to their overpotentials.

Figure 5:
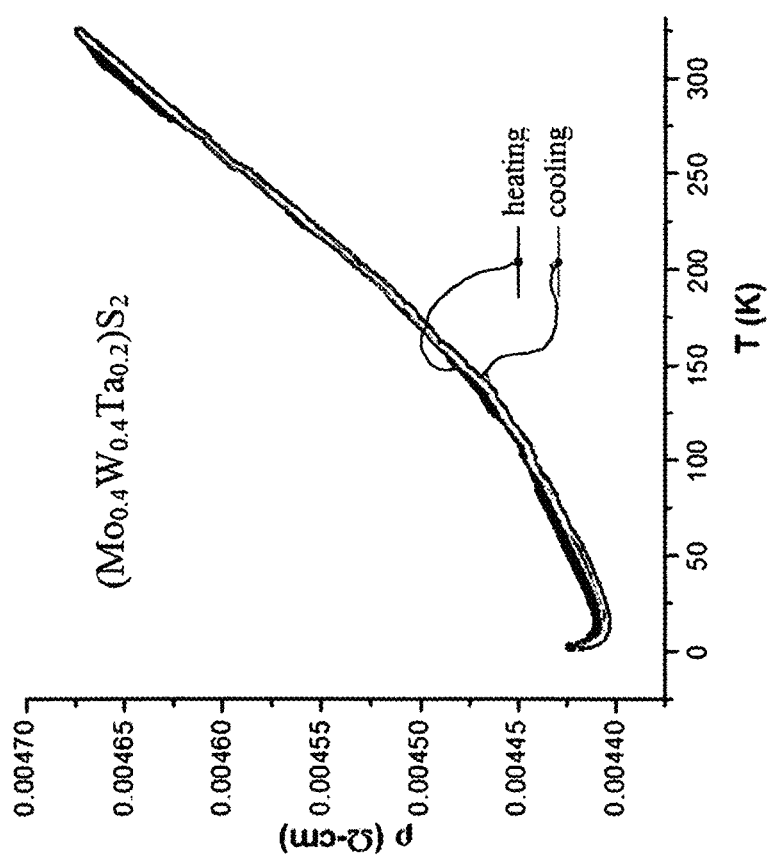
FIG. 5 shows resistivity of $(Mo_{0.4}W_{0.4}Ta_{0.2})S_2$ vs. temperature.

For example $(W_{0.4}Mo_{0.4}Ta_{0.2})S_2$ showed metallic behavior, while conventional TMDCs are indirect band gap semiconductors and have poor electric conductivity (reference 9). The electrical resistivity of $(W_{0.4}Mo_{0.4}Ta_{0.05})S_2$ was recorded between 350K and 2K in the absence of magnetic field using a four-terminal alternating current transport setup available in the physical property measurements system from Quantum Design, Inc. The room temperature resistivity of this material is 4.7 m$\Omega$-cm and it slightly decreases with the temperature decreasing into the cryogenic region (FIG. 5). The room temperature resistivity of $(Mo_{0.475}W_{0.475}Ta_{0.05})S_2$ is similarly metallic, i.e. 8.5 m$\omega$-cm. It is slightly lower due to the lower Ta content in the material.

In general, room temperature electrical resistivities below 1 $\Omega$-cm can be obtained by the TMDC material pursuant to embodiments of the present invention.

Figure 6:
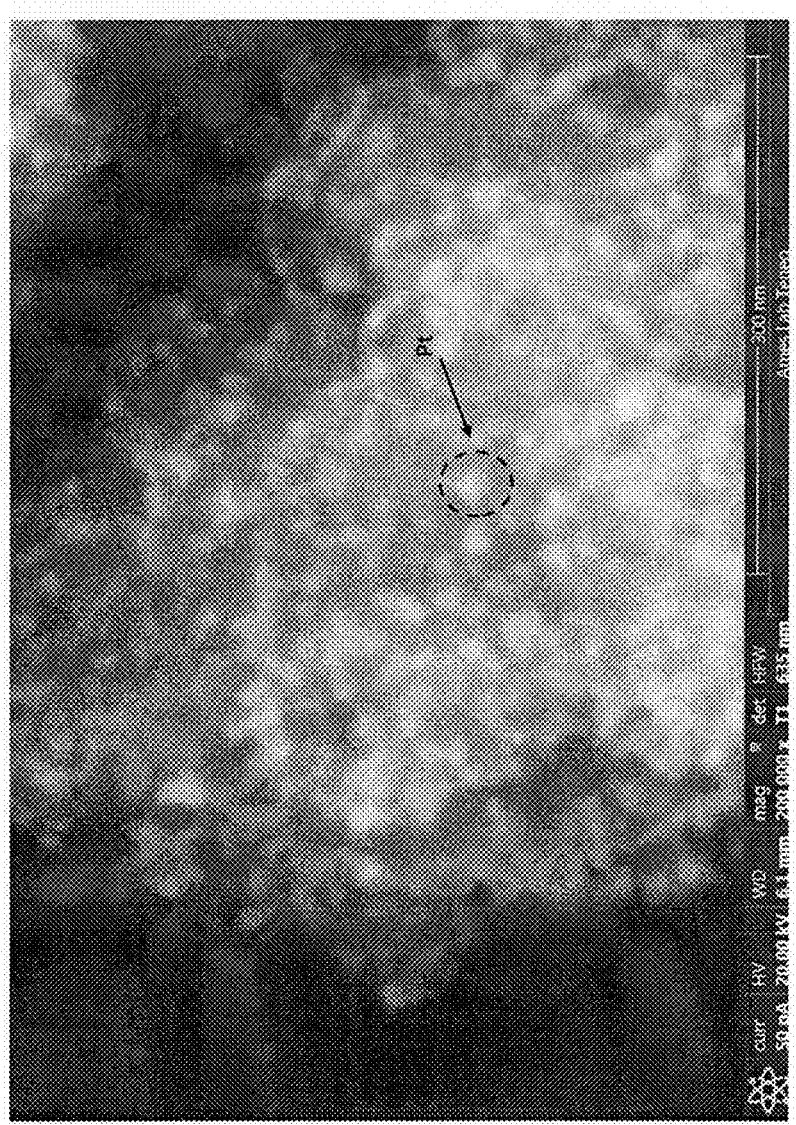
FIG. 6 is a scanning electron microscopy (SEM) image showing nanosized (less than 50 nm) platinum islands on the surface of the $(Mo_{0.4}W_{0.4}Ta_{0.2})S_2$ electrode after 1000 consecutive LSV scans.

The present invention also provides in still other embodiments a cathode comprising a transition metal dichalcogenide substrate having platinum (Pt) nanosized islands or precipitates disposed on the cathode surface as described below. As example, FIG. 6 shows SEM image of the platinum (Pt) island precipitates on the $(Mo_{0.4}W_{0.4}Ta_{0.2})S_2$ electrode, which has been exposed to 1000 consecutive LSV scans in the electrochemical test cell with the Pt counter electrode. The nanosized islands comprising Pt are less than 50 nm in size as measured along one of the dimensions thereof. Referring back to FIG. 6, this cathode embodiment is advantageous in that such a cathode behaves electrochemically in aqueous electrolysis essentially very similar to metallic platinum.

Figure 7A:
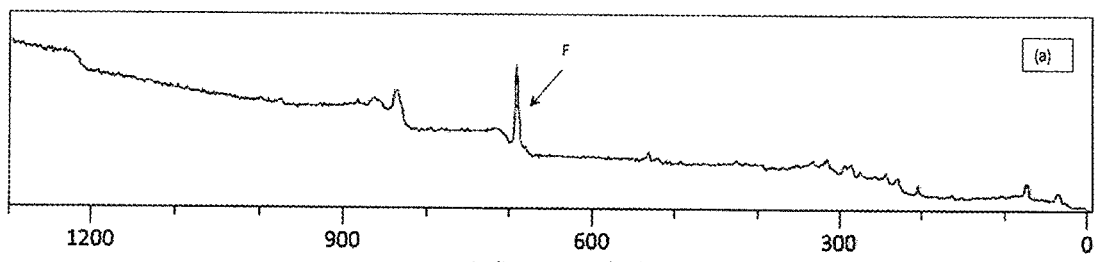
FIG. 7a is an X-ray photoelectron spectrum (XPS) of the $(Mo_{0.4}W_{0.4}Ta_{0.2})S_2$ electrode surface after 1000 consecutive LSV scans
Figures 7B, 7C, 7D, 7E:
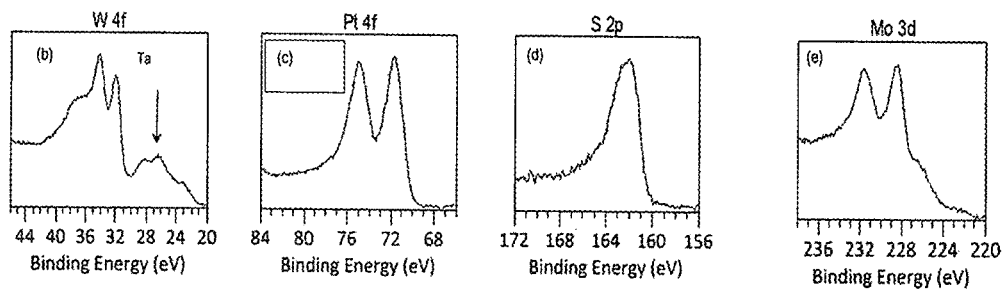
FIGS. 7b-7e show enhanced spectrum areas that correspond to the signals of main elements forming the electrode. The spectrum of FIG. 7a also contains the strong signal of fluorine from the Nation@ binder used for the electrode preparation.

The X-ray photoelectron spectroscopic (XPS) examination of this $(Mo_{0.4}W_{0.4}Ta_{0.2})S_2$ electrode confirmed the presence of Pt on its surface as well as the presence of all other elements including Mo, W, Ta, S and fluorine (F) that is an element of the Nafion conductive binder coating used for the electrode preparation (FIG. 7).

Deposition of Pt and the performance improvement associated with the presence of Pt nano-islands on the surface of the TMDC electrode has not been observed for the other electrode materials that did not contain Ta. Thus, Ta and, possibly other dopants that improve intrinsic electrical conductivity of TMDCs, can be employed to achieve the observed phenomenon.

Certain illustrative method embodiments of the present invention form such a cathode by applying consecutive voltage scans to a TMDC material that contains Ta in an aqueous solution in the presence of a platinum counter electrode until the Pt nanosized islands comprising platinum are deposited on the material. For example, the cathode can be formed by applying repeated LSV scans to a pristine conductive Ta-containing TMDC cathode substrate in aqueous solution in the presence of a platinum counter electrode until the Pt nanosized islands or precipitates form on the cathode substrate. An exemplary method embodiment forms such a cathode electrode using a 0.5M $H_2SO_4$ aqueous electrolyte and a cathode electrode material that contains Ta as described above, a Pt counter electrode, and a Ag/AgCl reference electrode of the type described above and changing the potential (voltage) from 0 V to −0.5V or so. The scans are repeated multiple times until Pt precipitates as nanosized islands on the TMDC cathode electrode.

Alternately, chemical deposition of the nanosized islands comprising platinum on a surface of a TMDC material that contains Ta as described above can be effected by immersing or otherwise contacting the Ta-containing TMDC material in an aqueous solution containing a Pt compound to effect a chemical reduction reaction (without applied electrical current/voltage). The Pt compound can include, but is not limited to, a water-soluble Pt salt represented by $M_yPtX_z$, wherein M represents H, Li, Na, K, $NH_4$ or another appropriate cation and X represents at least one of Cl, Br, I, $NO_3$ and an organic substituent such as $C_2O_4$, y=1-2, and z=1-6.

Cathode materials pursuant to these illustrative embodiments of the invention are advantageous in that they are stable in acidic aqueous environments, meaning that they do not decay, during water electrolysis and exhibit an overpotential below 0.5 V vs. the reversible hydrogen electrode (RHE) at 10 mA/cm² current density during electrolysis of water in acidic environment at room temperature.

Although the present invention has been described with respect to certain illustrative embodiments, those skilled in the art will appreciate that changes and modifications can be made therein within the scope of the invention as set forth in the appended claims.

REFERENCES WHICH ARE INCORPORATED HEREIN BY REFERENCE

1. Turner J. A. *Science*, 305, 972 (2004).
2. https://www.energy.gov/eere/articles/hydrogen-clean-flexible-energy-carrier
3. Zou, X., Zhang, Y. *Chem. Soc. Rev.*, 44, 5148 (2015)
4. Wang, Y. et al. *Chem. Sus. Chem*, 11, 2724 (2018).
5. Li, Y. et al. *J. Am. Chem. Soc.* 133, 7296 (2011).
6. Schmidt, O. et al. *Int. J. Hydr. Energy*, 42, 30470 (2017).
7. Chia, X., Pumera, M. *Chem. Soc. Rev.* 47, 5602 (2018).
8. Zhang G. et al. *Electrochem. Acta*, 279, 19 (2018).
9. A. Kolobov and J. Tominaga. *Springer Series in Materials Science*, 239. *Two-Dimensional Transition-Metal Dichalcogenides*; Springer International Publishing AG: Switzerland, 2016.
10. Eftekhari, A. *Int. J. Hydrogen Energy* 42, 11053 (2017)
11. Wang, Y et al. *Chem. Eur. J.*, 23, 10430 (2017)
12. Lei, Y. et al. *ACS Nano*, 11, 5103 (2017)
13. Liu, Y. et al. *Scientific Reports* 6, 22516 (2016)
14. Nguyen, V. et al. *ACS Appl. Mater. Interfaces* 11, 14786 (2019)

We claim:

1. A water electrolysis cell, comprising an anode, a cathode, and an electrical power source wherein the cathode is comprised of an electrode material for effecting a hydrogen evolution reaction via water electrolysis and comprising a single, solid solution phase consisting of a transition metal chalcogen phase devoid of a non-transition metal chalcogen phase, represented by the general formula of:

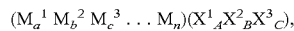

wherein $M^1$, $M^2$, $M^3$ ... $M_n$ each represents a different transition metal and wherein at least three transition metals are present and the sum of a+b+c ... n is between 1 and 3, wherein $X^1$, $X^2$, $X^3$ each represents a chalcogen element selected from the group consisting of S as $X^1_A$, Se as $X^2_B$, and Te as $X^3_C$ wherein the chalcogen element includes S alone or S and at least one of Se and Te and wherein the sum of A+B+C is between 2 and 6 with the proviso that Se is present only together with S as A+B=2, and wherein the material does not contain platinum as a principal (major) component and exhibits a stable overpotential during water electrolysis at room temperature.

2. The electrolysis cell of claim 1 wherein the electrode material comprises three group 4 and/or group 5 transition metals, and/or group 6 transition metal, and/or group 9 transition metal, and/or group 10 transition metal.

3. The electrolysis cell of claim 1 wherein the electrode material contains Ta as a transition metal.

4. The electrolysis cell of claim 3 wherein the electrode material that comprises at least one of $(W_{0.4}Mo_{0.4}Ta_{0.2})S_2$, $(W_{0.475}Mo_{0.475}Ta_{0.05})S_2$, $Mo_{0.475}W_{0.475}Ta_{0.05})SSe$ and $(Mo_{0.4}W_{0.4}Ta_{0.2})SSe$.

5. The electrolysis cell of claim 1 wherein the electrode material comprises particles of the size between 0.6 nm and 5 micron (5000 nm) in at least one dimension.

6. The electrolysis cell of claim 1 wherein the electrode material comprises particles of the size between 0.6 nm and 5 micron (5000 nm) in one dimension and more than 1 micron (5000 nm) in the second and/or third dimensions wherein the particles include at least one of nano plates, micro plates, rods, wires, tubes, and thin films.

7. The electrolysis cell of claim 1 wherein the electrode material exhibits an overpotential below 0.5 V vs the reversible hydrogen electrode (RHE) at 10 mA/cm² current density during electrolysis of water in acidic environment at room temperature.

8. The electrolysis cell of claim 1 wherein the electrode material exhibits an overpotential below 0.1 V vs the reversible hydrogen electrode (RHE) at 10 mA/cm² current density during electrolysis of water in acidic environment at room temperature.

9. The electrolysis cell of claim 1 wherein the electrode material exhibits at least one of metallic electrical resistivity and semi-metallic electrical resistivity.

10. The electrolysis cell of claim 1 wherein the electrode material contains at least three transition metals selected from the group Cr, Mo, W, Ta, Nb, V, Hf, Zr, Pd, and Pt.

11. The electrolysis cell of claim 1 wherein the transition metal chalcogen phase of the cathode includes Ta as a transition metal.

12. The electrolysis cell of claim 11 wherein the cathode comprises at least one of $(W_{0.4}Mo_{0.4}Ta_{0.2})S_2$, $(W_{0.475}Mo_{0.475}Ta_{0.05})S_2$, $Mo_{0.475}W_{0.475}Ta_{0.05})SSe$ and $(Mo_{0.4}W_{0.4}Ta_{0.2})SSe$.

* * * * *

UNITED STATES PATENT AND TRADEMARK OFFICE
CERTIFICATE OF CORRECTION

| | | |
|---|---|---|
| PATENT NO. | : 11,585,000 B2 | Page 1 of 1 |
| APPLICATION NO. | : 16/602420 | |
| DATED | : February 21, 2023 | |
| INVENTOR(S) | : Viktor Balema et al. | |

It is certified that error appears in the above-identified patent and that said Letters Patent is hereby corrected as shown below:

On the Title Page

Column 1, Item (72), Line 8, should read:
--(US); Prashant Singh, Ames, IA--

Signed and Sealed this
Ninth Day of May, 2023

*Katherine Kelly Vidal*

Katherine Kelly Vidal
*Director of the United States Patent and Trademark Office*